United States Patent
Hudson et al.

(10) Patent No.: US 7,427,452 B2
(45) Date of Patent: Sep. 23, 2008

(54) OPERATING ELECTROLYTE BASED COMPONENTS

(75) Inventors: Steven Martin Hudson, Sturminster Newton (GB); Daniel Joinson, Carterton (GB)

(73) Assignee: Expro North Seal Limited, Reading, Berkshire (GB)

( * ) Notice: Subject to any disclaimer, the term of this patent is extended or adjusted under 35 U.S.C. 154(b) by 739 days.

(21) Appl. No.: 10/492,007

(22) PCT Filed: Oct. 10, 2002

(86) PCT No.: PCT/GB02/04592

§ 371 (c)(1), (2), (4) Date: Aug. 30, 2004

(87) PCT Pub. No.: WO03/034522

PCT Pub. Date: Apr. 24, 2003

(65) Prior Publication Data

US 2004/0265682 A1 Dec. 30, 2004

(30) Foreign Application Priority Data

Oct. 12, 2001 (GB) ................................ 0124589.3

(51) Int. Cl.
*H01M 2/00* (2006.01)
*H01M 14/00* (2006.01)
(52) U.S. Cl. .......................... 429/163; 429/6
(58) Field of Classification Search .................. None
See application file for complete search history.

(56) References Cited

U.S. PATENT DOCUMENTS

| | | | |
|---|---|---|---|
| 2,622,339 A * | 12/1952 | Hewitt, Jr. .................. | 33/314 |
| 3,514,341 A | 5/1970 | Cook | |
| 3,809,581 A | 5/1974 | Hutchison | |
| 4,012,234 A * | 3/1977 | Kraft ............................ | 429/48 |
| 4,109,062 A | 8/1978 | McCartney et al. | |
| 4,189,528 A | 2/1980 | Klootwyk | |
| 4,738,904 A | 4/1988 | Ludwig et al. | |
| 5,360,678 A | 11/1994 | Spillman et al. | |
| 5,441,825 A | 8/1995 | Barlow | |
| 5,670,272 A | 9/1997 | Cheu et al. | |
| 5,786,980 A | 7/1998 | Evans | |

(Continued)

FOREIGN PATENT DOCUMENTS

GB    2 009 473    6/1979

(Continued)

OTHER PUBLICATIONS

International Search Report for PCT/GB02/04592 completed Jan. 23, 2003.

*Primary Examiner*—Patrick Ryan
*Assistant Examiner*—Julian Mercado
(74) *Attorney, Agent, or Firm*—Alston & Bird LLP

(57) ABSTRACT

A method of operating a downhole component (for example a battery pack) comprising at least one electrolyte based element. The method comprising the steps of locating the component in a downhole environment and whilst the component is in the downhole environment subjecting the element to a pressure in excess of atmospheric pressure to suppress at least one of boiling and evaporation of electrolyte in the element. The component may then be operated at a temperature in excess of that which would be tolerated by the electrolyte based element if not subjected to a pressure in excess of atmospheric pressure.

17 Claims, 3 Drawing Sheets

U.S. PATENT DOCUMENTS 5,876,872 A * 3/1999 Feezor ..................... 429/118
6,224,997 B1   5/2001 Papadopoulos

FOREIGN PATENT DOCUMENTS

| | | |
|---|---|---|
| JP | 2001148250 | 5/2001 |
| WO | WO 93/18277 | 9/1993 |
| WO | WO 99/05743 | 2/1999 |
| WO | WO 01/91206 | 11/2001 |

* cited by examiner

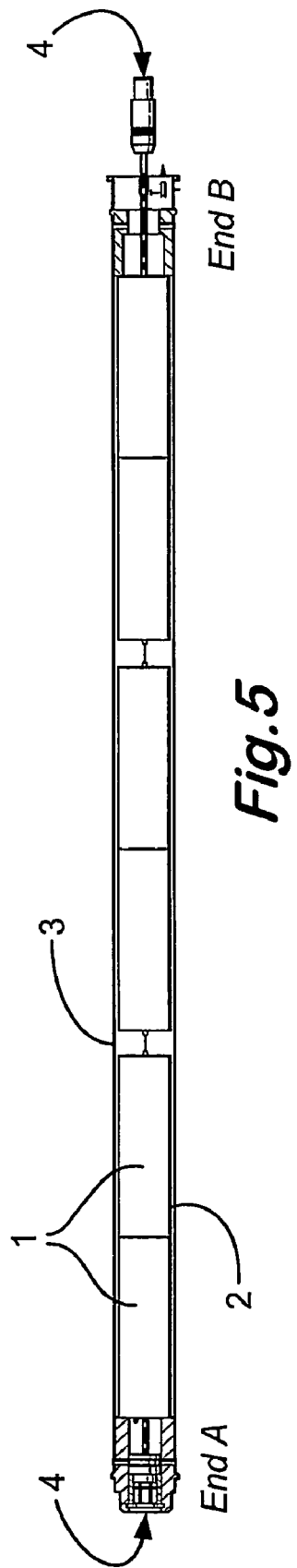
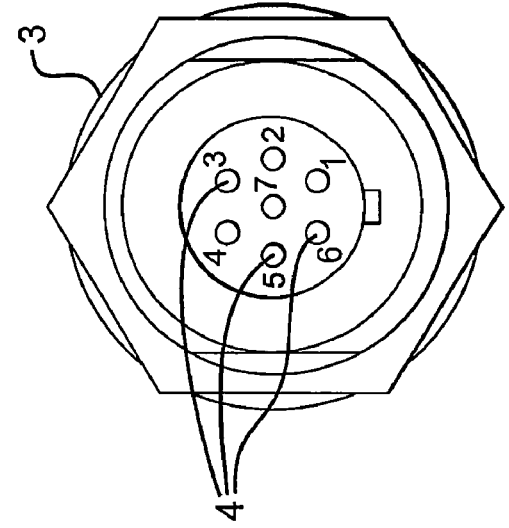
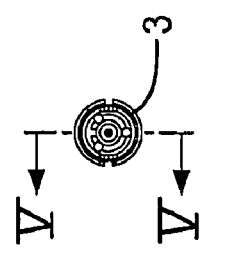
Fig. 5
Fig. 7
Fig. 4

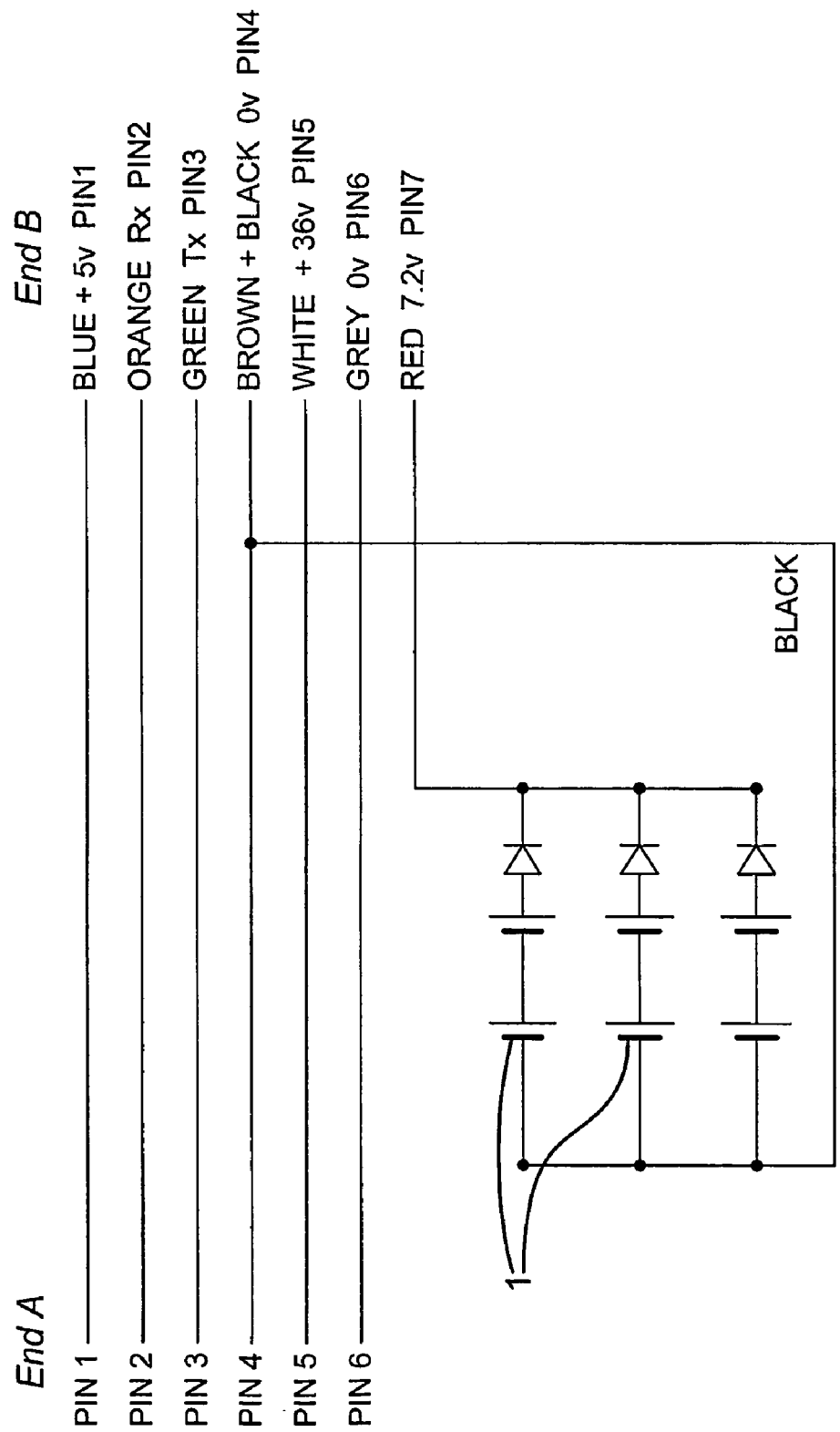

OPERATING ELECTROLYTE BASED COMPONENTS

BACKGROUND OF THE INVENTION

This invention relates to the operation of electrolyte based components, particularly in pipeline systems of the type used in the oil and gas industry. The invention is particularly relevant in situations where electrolyte based components are exposed to high temperature environments.

In this application the expression electrolyte based component is used to mean any component or device in which the presence of an electrolyte plays a role in the functioning of the component. The expression electrolyte based component includes batteries and electrolytic capacitors.

In the oil and gas industry there is often a need to power electronics or other equipment in situations where the ambient temperature is significantly above normal climatic temperatures. One such situation is downhole in a well, where the ambient temperature might be a hundred to a few hundred degrees centigrade due to geothermal effects. Such "high temperature" environments have a detrimental effect on the operation of electrolyte based components. In particular, the electrolyte in batteries or capacitors, can have a tendency to boil or evaporate at an accelerated rate. These effects can cause catastrophic failure or impaired performance such as accelerated self discharge.

BRIEF SUMMARY OF THE INVENTION

It is an object of this invention to provide a way to increase the temperature at which a given type of electrolyte based component will operate.

According to one aspect of the present invention there is provided a method of operating a component comprising at least one electrolyte based element, the method comprising the step of subjecting the element to a pressure in excess of atmospheric pressure to suppress boiling and/or evaporation of electrolyte.

According to another aspect of the present invention there is provided a method of operating a component comprising at least one electrolyte based element, the method comprising the steps of disposing the element in a pressure containment vessel and pressurising the vessel to suppress the boiling and/or evaporation of electrolyte.

Preferably the pressure in the vessel is in excess of atmospheric pressure, at least during operation.

According to another aspect of the present invention there is provided a component assembly comprising a vessel within which is disposed at least one electrolyte based element wherein the vessel is arranged to be pressurised to a pressure in excess of atmospheric pressure to suppress the boiling and/or evaporation of electrolyte.

Preferably the vessel is a pressure containment vessel. Preferably the pressure containment vessel is pressurised to a pressure in excess of atmospheric pressure, at least during operation.

Methods and assemblies of the present invention enable the effective operation of electrolyte based components at higher temperatures than would otherwise be the case.

As mentioned above examples of components comprising electrolyte based elements are batteries and electrolytic capacitors. In the case of a battery the element would be a cell.

The pressure to which the element (or each element) is subjected may be chosen to give the desired effect in electrolyte boiling/evaporation suppression. The pressure is preferably in the order of 3 to 6 bar. The pressure containment vessel may be filled with any suitable fluid to provide the desired pressure, examples include air, nitrogen and oil.

The pressure containment vessel preferably comprises at least one bi-directional pressure seal to seal the interior of the vessel against the surroundings. A bi-directional pressure seal is one arranged to provide a seal whether the external pressure is greater or smaller than the pressure in the containment vessel.

In the case of batteries, typically there will be a battery or battery pack comprising a plurality of cells and a casing, all of the cells being disposed within the vessel. In some embodiments the pressure containment vessel may be the casing of the battery itself. Similarly in the case of other components the casing may act as the pressure containment vessel. Preferably however, the pressure containment vessel is provided independently of any casing.

It is currently preferred to subject the electrolyte based element to pressure by pressurising a sealed pressure containment vessel. This will typically be done during manufacture or assembly and before installation. However, in alternatives the element may be subjected to pressure by exposure to the ambient pressure. It will be appreciated that in downhole situations, not only is the temperature high but there is also high, ie well above atmospheric, pressure. It is envisaged that the element might be exposed directly or indirectly to the ambient pressure. Means may be provided such that although the pressure experienced by the element is due to ambient pressure, the value of the pressure is controlled. In some such cases the pressure to which the element is exposed may be a small fraction of the ambient pressure.

The method may be a pipeline system electrolyte based component, capacitor, or battery operation method. The method may be a downhole electrolyte based component, capacitor, or battery operation method. The assembly may be a pipeline system electrolyte based component, capacitor, or battery assembly. The assembly may be a downhole electrolyte based component, capacitor, or battery assembly.

BRIEF DESCRIPTION OF THE SEVERAL VIEWS OF THE DRAWINGS

Embodiments of the present invention will now be described, by way of example only, with reference to the accompanying drawings in which:

FIG. 4 is an end view of battery assembly of the same type as the first battery assembly showing more detail;

FIG. 5 is a section on line V-V of the battery assembly shown in FIG. 4;

FIG. 6 is a wiring diagram showing the wiring of the battery assembly shown in FIG. 4; and FIG. 7 shows the arrangement of connection pins at the end of the battery assembly shown in FIG. 4.

DETAILED DESCRIPTION OF THE INVENTION

The embodiments described below in general relate to battery based methods and assemblies. It will be appreciated however, that most the ideas and arrangements discussed are equally applicable to all electrolyte based components, in particular electrolytic capacitors.

Figure 1:
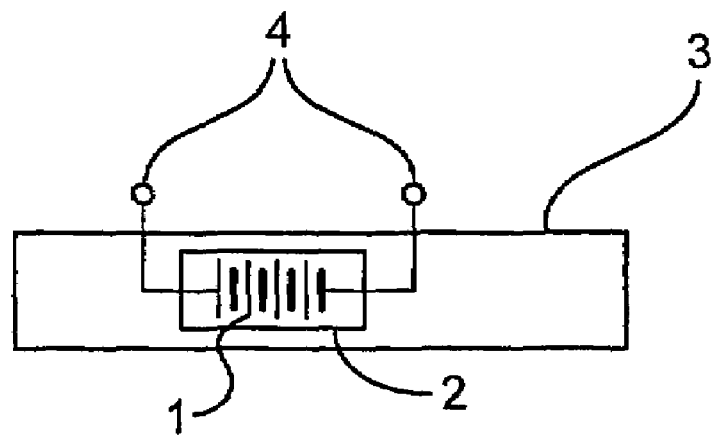
FIG. 1 schematically shows a first battery assembly.

FIG. 1 schematically shows a first battery assembly which comprises a plurality of electrolyte based electric cells 1 surrounded by a battery casing 2 to form a battery pack. The battery pack 1,2 is disposed within a pressure containment vessel 3 which is arranged to be pressurised to a pressure in the range of 3-6 bar in this embodiment. Terminals 4 are provided on the exterior of the pressure containment vessel 3 to allow electrical connection to the battery pack 1,2.

The pressure containment vessel 3 is filled with air at a pressure in the desired range during manufacture or assembly. At least one bi-directional seal (not shown) is provided between two parts of the vessel 3 which can be separated to allow the introduction of the cells 1. The battery casing 2 is arranged to allow the cells 1 to be subjected to the pressure in the pressure containment vessel 3. It should be noted, however, that this does not generally call for any modification of the casing 2 of conventionally used batteries.

The battery assembly is intended for use in high temperature environments. In particular, the assembly is intended for use in pipeline systems used in the oil and gas industry. Moreover the assembly is particularly suited for use in downhole locations in wells. Typically the assembly will be used in conjunction with other components as part of a downhole tool. Such a tool might for example be used in the communication of data between the downhole location and the surface. In such a case the cells would provide the energy required to receive signals and transmit signals to the surface. Other examples of equipment for which batteries are used as a power supply downhole, include data loggers, pressure and temperature sensors, drilling guidance and control systems and mud pulsing telemetry systems.

Subjecting electrolyte based cells 1 to increased pressure allows the cells 1 to be operated at a higher temperature than would otherwise be the case because the boiling or evaporation of electrolyte is suppressed.

It will be appreciated that many batteries (and other electrolyte based components) have a maximum normal operating temperature under normal conditions. This may be specified by the manufacturers or empirically determined when the component is used at atmospheric pressure. By making use of the present invention batteries or other components may be operated at above such a temperature.

The type of cells used may be chosen to suit circumstances. In some existing systems of the applicant using conventional battery assemblies, the downhole conditions have necessitated the use of high temperature tolerant lithium based cells. However, with the present battery assembly it has been shown possible to use cheaper, alkaline batteries (in place of the lithium cells) at temperatures of 110 degrees centigrade where the pressure in the containment vessel 3 is 5 bar. It is also suspected that at this temperature the pressure could be reduced somewhat below 5 bar. In some situations at least some of the desired pressure may be realised automatically by virtue of the fluid pressure increasing with temperature. The fluid used might be selected to enhance this effect.

In some cases it might be desired to use the present battery assembly with lithium cells to improve their performance. These lithium cells might be of a cheaper, less temperature tolerant, type. In general, any electrolyte based cell may benefit from being operated in an assembly of the present type. Rechargeable as well as primary cells can be used.

Whilst in the present embodiment, the cells 1 and battery casing 2 are disposed in a separate pressure containment vessel 3, it is envisaged that in a specially produced battery pack, the battery casing might itself act as the pressure containment vessel.

Figure 2:
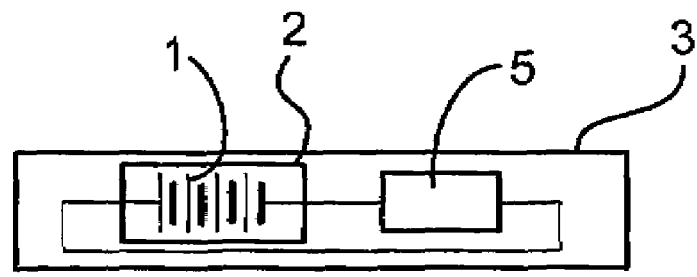
FIG. 2 schematically shows a second battery assembly.

FIG. 2 shows a second battery assembly which is similar to the first assembly shown in FIG. 1, with corresponding elements being given the same reference numerals. The second battery assembly differs from the first in that an electronics/equipment module 5 is disposed within the pressure containment vessel 3. Thus in this case rather than terminals being provided on the exterior of the vessel 3, the electronics/equipment module 5 which requires the power to be supplied by the cells 1 is disposed in the same pressure vessel as the cells 1. This arrangement serves to protect the electronics/equipment 5 from the environment without the provision of a separate vessel. However, such an arrangement is of course only practical where the electronics/equipment can operate under the pressure required to give the desired improvement in cell temperature tolerance. On the other hand there is the advantage that any other electrolyte based components in the electronics/equipment equally benefit from the increased pressure. In at least some instances the fluid chosen to provide pressure in the vessel 3 should be selected to avoid damage to silicon components—Nitrogen is a good choice in this regard.

Figure 3:
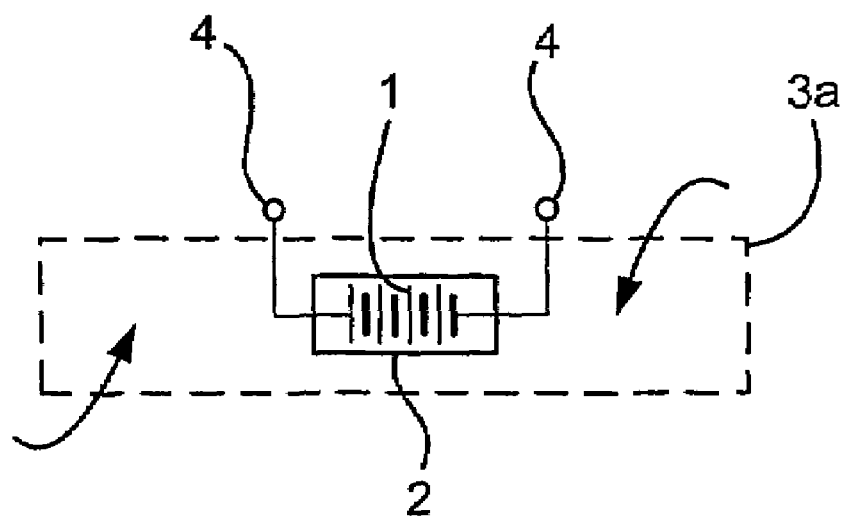
FIG. 3 schematically shows a third battery assembly.

FIG. 3 schematically shows a third battery assembly which is similar to the first two battery assemblies, again the same reference numerals are used to indicate corresponding elements. However, in this case, the cells 1 are provided in a vessel 3a which is not a pressure containment vessel. Rather in this case the vessel 3a is arranged to allow ambient pressure to act on the cells 1 within the casing 2. The suppression of electrolyte boiling and evaporation may thus be achieved without the need for a sealed pressurised vessel. However, such an assembly will be of limited application, at least in wells, because of the very high pressures which typically exist in the downhole environment. Where there is a very high ambient pressure, there is a risk that any small void in the battery could give rise to distortion or damage to the cell, battery or casing. Another possibility which is envisaged is using the ambient pressure in a more controlled way to apply pressure to the cells 1.

FIGS. 4 to 7 show, in more detail, a battery assembly of the type shown in FIG. 1. The assembly comprises three "double D" cell alkaline battery packs, each comprising two cells 1 and a casing 2. The cells 1 are wired to one another in the way shown in the wiring diagram of FIG. 6 and are housed in an aluminium tube (not shown). The aluminium tube containing the six cells 1 is itself housed in generally cylindrical steel pressure containment vessel 3.

FIG. 7 shows an end view of part of the battery assembly. Seven terminal pins 4 are provided at each end of the battery assembly, one set of these pins can be seen in FIG. 7. The wiring of the cells 1, as shown in FIG. 6, is such that external connection can be made to the cells 1 via the appropriate pins 4.

In assembly of the battery assembly an end portion of the steel vessel 3 is removed and the aluminium tube containing the ready wired cells 1 is inserted. The end portion is then replaced and the air in the vessel is pressurised to the desired pressure of say 3 bar. A bi-directional seal is provided between the end portion and the remainder of the vessel 3 so that the desired pressure is retained in the vessel 3 whether the external pressure is lower (eg during assembly) or higher (eg in situ downhole) than the internal pressure.

Once assembled the battery assembly may be deployed and connected to the electronics/equipment which the cells 1 are to power.

The invention claimed is:

1. A method of operating a battery comprising at least one electrolyte based cell, the method comprising the steps of disposing the battery together with one of an electronics module and an equipment module in a pressure containment vessel, locating the vessel containing the battery and said one of an electronics module and an equipment module in a downhole environment and whilst the battery is in the downhole environment suppressing at least one of boiling and evaporation of electrolyte in the cell by subjecting the cell to a pressure in excess of atmospheric pressure, wherein the suppressing step comprises the step of pressurising the vessel to a predetermined pressure in excess of atmospheric pressure before locating the vessel in a downhole environment.

2. A method according to claim 1 comprising the further step of operating the battery at a temperature in excess of that which would be tolerated by the electrolyte based cell if not subjected to a pressure in excess of atmospheric pressure.

3. A method according to claim 1 wherein the electrolyte based cell has a specified maximum normal operating temperature for normal operating conditions and the method comprises the step of operating the electrolyte based cell at a temperature in excess of said maximum normal operating temperature.

4. A method according to claim 1 wherein the battery is located in a downhole environment having a temperature in the range of 100° C. to 500° C.

5. A method according to claim 1 in which the pressure to which the cell is subjected is in the order of 3 to 6 bar.

6. A method according to claim 1 in which the pressure containment vessel is filled with one of air, nitrogen and oil to provide the desired pressure.

7. A method according to claim 1 in which the pressure containment vessel comprises at least one bi-directional pressure seal to seal the interior of the vessel against the surroundings.

8. A method according to claim 1, further comprising providing the pressure containment vessel with at least one bi-directional pressure seal to seal the interior of the vessel against the surroundings.

9. A method according to claim 1, further comprising using a battery which has a casing which is independent of the pressure containment vessel.

10. A downhole component assembly comprising a pressure containment vessel within which is disposed a battery comprising at least one electrolyte based cell and one of an electronics module and an equipment module wherein the vessel is arranged to be pre-pressurised to a predetermined pressure in excess of atmospheric pressure, prior to location of the component assembly downhole, to suppress at least one of boiling and evaporation of electrolyte in the cell when the component assembly is located downhole whereby the component assembly is arranged to be subjected to temperatures in excess of a normal operating temperature of the battery.

11. A well installation comprising a downhole component assembly according to claim 10, wherein the vessel is pressurised to a pressure in excess of atmosphere pressure and the assembly is disposed at a location in the well installation where the temperature is in excess of that which would be tolerated by the electrolyte based cell if at atmosphere pressure.

12. A well installation according to claim 11, wherein the pressure containment vessel comprises at least one bi-directional pressure seal to seal the interior of the vessel against the surroundings.

13. A well installation according to claim 11, wherein the battery has a casing which is independent of the pressure containment vessel.

14. A component assembly according to claim 10, wherein the pressure containment vessel comprises at least one bi-directional pressure seal to seal the interior of the vessel against the surroundings.

15. A component assembly according to claim 10, wherein the battery has a casing which is independent of the pressure containment vessel.

16. A downhole component assembly usable at 100° C. and above, comprising a pressure containment vessel within which is disposed a battery comprising at least one electrolyte based cell and one of an electronics module and an equipment module wherein the vessel is arranged to be pre-pressurised to a predetermined pressure in excess of atmospheric pressure, prior to location of the component assembly downhole, to suppress at least one of boiling and evaporation of electrolyte in the cell when the component assembly is located downhole whereby the component assembly is arranged to be subjected to temperatures in excess of 100° C.

17. A well installation comprising a downhole component assembly according to claim 16, wherein the vessel is pressurised to a pressure in excess of atmosphere pressure and the assembly is disposed at a location in the well installation where the temperature is in excess of 100° C.

* * * * *